United States Patent [19]

Bach

[11] 3,707,880
[45] Jan. 2, 1973

[54] HYDRAULIC BRAKE BOOSTER WITH PISTON RETURN DEVICE

[75] Inventor: Lloyd G. Bach, South Bend, Ind.

[73] Assignee: The Bendix Corporation, South Bend, Ind.

[22] Filed: Dec. 18, 1970

[21] Appl. No.: 99,413

[52] U.S. Cl. ..................91/391, 91/373, 91/376
[51] Int. Cl. ....................F15b 13/10, F15b 13/16
[58] Field of Search........91/417 R, 417 A, 416, 376, 91/391 A, 391 R, 373

[56] References Cited

UNITED STATES PATENTS

| 2,928,378 | 3/1960 | Leduc | 91/376 |
| 2,936,739 | 5/1960 | Levensteins et al. | 91/416 |
| 3,044,451 | 7/1962 | Morrison | 91/416 |
| 3,087,466 | 4/1963 | Tobias | 91/417 A |
| 3,257,912 | 6/1966 | Horst | 91/417 R |

Primary Examiner—Paul E. Maslousky
Attorney—Plante, Hartz, Smith & Thompson and Ken C. Decker

[57] ABSTRACT

A brake applying mechanism having a chamber with inlet and outlet ports, a piston slidably arranged in the chamber and a valve to be controlled by an operator for admitting fluid under pressure from the inlet to thereby act on the piston in such a manner as to cause it to advance in the chamber. The piston is returned from the position to which it advanced under fluid pressure by a return mechanism normally opposing advance of the piston. Upon failure of inlet fluid pressure the piston can be advanced manually by the operator unopposed by the return mechanism which is now rendered ineffective.

10 Claims, 2 Drawing Figures

PATENTED JAN 2 1973					3,707,880

INVENTOR
LLOYD G. BACH
BY
Plante, Hartz, Smith & Thompson
ATTORNEYS

HYDRAULIC BRAKE BOOSTER WITH PISTON RETURN DEVICE

BACKGROUND OF THE INVENTION

The brake applying mechanism herein disclosed relates to hydraulic brake booster devices which employ manual push-through means operative in the event of failure of fluid pressure.

Innovations to vehicle braking systems have kept pace with, if not surpassed improvements in other areas of the automotive field. The introduction of the power brake boosters disclosed in U.S. Applications, Ser. Nos. 793,923, now U.S. Pat. No. 3,603,209, and 73,934, filed Jan. 16, 1969, and Sept. 21, 1970, respectively, and owned by the assignee of the present invention, are examples of new trends in braking systems. In spite of such advances in the art, it is nevertheless realized that split second thinking and response of the vehicle operator can be the difference between a hit and a miss in a potential accident. However, split second response is not likely to help much if the brake mechanism is unduly resistive to the operator's braking effort, i.e., if the split second response of the operator is delayed due to the build-in resistance offered by the brake mechanism. This inherent resistance of the vehicle braking system to transfer the brake applying force of the operator to the wheel brakes is reduced by the brake mechanism disclosed.

SUMMARY OF THE INVENTION

In view of the foregoing, it is an important object of my invention to provide a brake applying mechanism which is susceptible to rapid manual application, to thereby reduce delay in fluid pressure build-up in the brake lines of a vehicle.

Another object of my invention is to provide a hydraulic brake booster in which a pressure differential operated piston can be moved more rapidly manually to stop a vehicle, by rendering the piston return means ineffective upon pressure failure.

A further object of my invention is to provide a hydraulic brake booster equipped with a push-through piston that is unresisted by the piston return means at times of inlet fluid pressure failure.

The above and other objects and features of the invention will become apparent from the following description taken in connection with the accompanying drawing.

DETAILED DESCRIPTION

Figure 1:
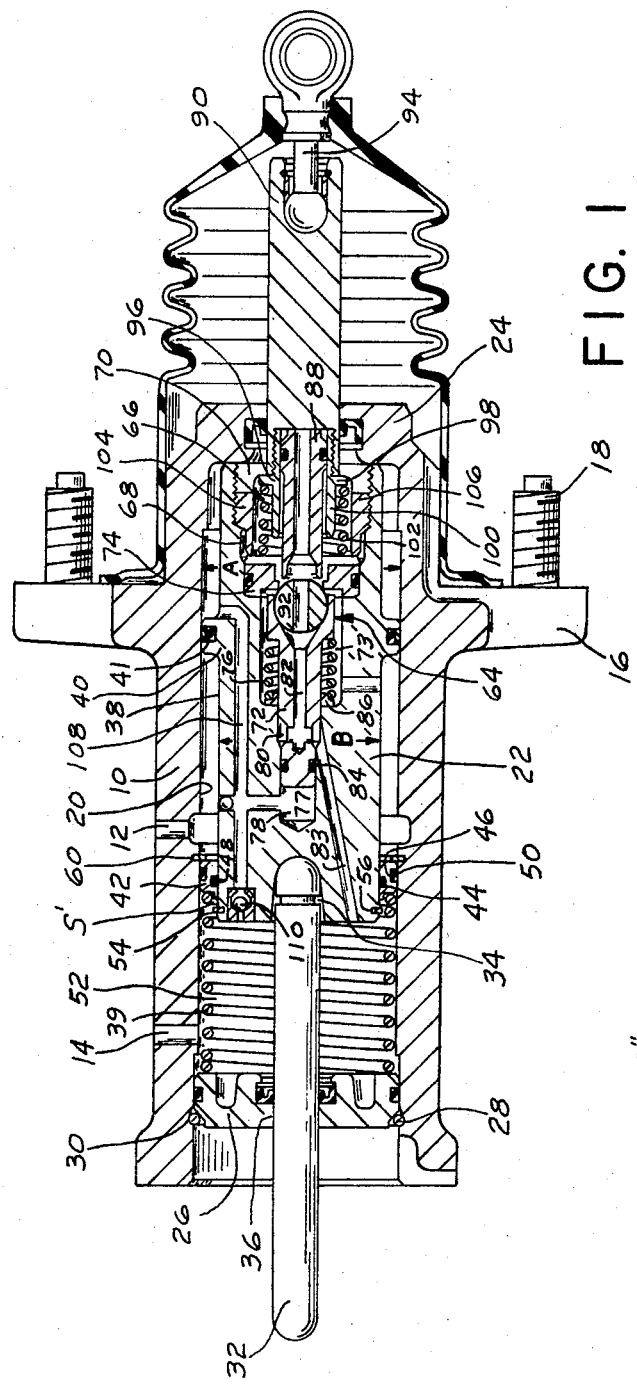
FIG. 1 is a longitudinal cross sectional view of a brake booster employing the teaching of my invention.

The brake applying mechanism of FIG. 1 is generally known in the vehicle braking art as a hydraulic brake booster. It comprises a housing 10 provided with a inlet port 12, connectible to a suitable pressure source (not shown), and an outlet 14, connectible to any suitable type of reservoir (not shown). A flange 16, integral with the housing 10, is equipped with studs 18 for attaching the housing to an appropriate section of a vehicle (not shown). The hydraulic system in which the brake booster is used is well known to those skilled in the art and need not be further elaborated upon.

The housing 10 defined a bore or chamber 20 in which a piston 22 is slidably positioned. The bore 20 is closed on one end by a radially inwardly extending flange 24, integrally cast as a part of the housing. A closure member 26 is removably inserted into the other end of the bore 20 to completely enclose the chamber or bore for retaining fluid under pressure. The closure member 26 is retained in position by a snap ring 28 which engages a groove 30 of the bore 20. Removal of the member 26 permits withdrawal of the piston and its component parts. A force transmitting rod 32 has one end carried in a recess 34 of the piston 22. The other end of the rod 32 projects exteriorly of the bore through a sealed opening 36 of the closure member 26 for driving engagement with a brake master cylinder (not shown) in a manner well known to those skilled in the art.

The piston 22 is formed with an annular recess or cavity 38 between lands 40 and 42. The recess 38 is in communication with the inlet port 12 at all times irrespective of the location of the piston 22 as it slides in the bore. A seal 41 precludes the escape of fluid from the cavity 38 to the right end of the bore 20. The piston is urged to the right end of the bore, as viewed in FIG. 1, by piston return means comprising a spring 39 and land 42, the latter of which is slidably carried on the piston 22. The land or sliding ring 42 is formed with oppositely facing grooves 44 and 46 to accommodate seals 48 and 50 respectively, to seal the recess 38 from chamber 52 located at the left end of the piston, and in communication with the outlet port 14. The land 42 is restricted in its travel to the left (as viewed in the drawings) along the piston by a snap ring 54 which engages a groove 56 of the piston. Snap ring 58 is located in a groove 60 of the housing bore to limit the travel of land 42 under the influence of the spring 39 interposed between the land 42 and the closure member 26. The area of the sliding ring 42 between diameter A of the piston and diameter B of the ring 42 generates sufficient force when recess 38 is connected to inlet fluid pressure to overcome the force of the spring 39. The inlet fluid pressure in recess 38 also acts on the fixed land 40 but since the areas of the lands 40 and 42 exposed to the fluid pressure in the recess 38 are equal, there is no net directional force established hydraulically on the booster piston 22. However, the return spring 39 creates a force to the right of sufficient magnitude to maintain the piston against flange 24 which acts as a stop. During power braking, i.e., with fluid pressure available, the sliding ring 42 is held against the snap ring 54 and no relative movement occurs between the sliding ring 42 and the snap ring 54. Accordingly, at this time the piston return means, which includes return spring 39, acts in the conventional manner in urging the piston to its stop against flange 24 at the right end of the bore, as viewed in FIG. 1.

Upon failure of fluid pressure in the recess or cavity 38, the return spring 39 moves the sliding ring 42 into engagement with the stationary snap ring 58. In this position of the ring or land 42, the return spring ceases to act on the snap ring 54 and hence the piston, thus removing the spring force from the latter. Manual braking in the circumstances of fluid pressure failure, encounters no return spring force opposing foot pedal input force of the operator. This permits faster brake pedal movement and consequently improved vehicle deceleration. Also, at times of manual braking, the net brake applying force exerted by the operator is of greater magnitude.

Piston movement toward the left end of the bore, as viewed in FIG. 1, is accomplished by operator-operated means comprising valve means 64 and push-through means 66 interconnected with the piston 22 in a manner hereinafter described in detail. The term "push-through" connotes a type of hydraulic brake booster in which the piston can be moved by the force of the operator in the event of a failure in the fluid pressure of the system. The valve means 64 is located in a main central stepped cavity 68 of the piston 22 for controlling communication between the recess 38, which is in continuous communication with the inlet 12, and the right end of the bore 22, which together with the piston forms a chamber 70. The valve means 64 also controls communication between said chamber 70 and the chamber 52, the latter of which is in continuous communication with the outlet 14. A valve member 72 is slidably positioned in a fluid pressure cavity 73, formed in the main central cavity so that one end of the member 72 is urged against a seating element 74, to thereby cut off the chamber 70 from the inlet 12. A spring 76 urges the member 72 against the element 74. One end of valve member 72 is guided in a reduced diameter portion 78 of the central cavity 68. The valve member 72 is formed with an annular groove 80 and a central passage 82, communicating the chamber 70 to the outlet 14 via a passage 83 in the piston 22. A chamber 77 is formed in the central stepped cavity 68 by the reduced diameter 78 and is sealed from the annular groove 80 by a seal 84. A seal 86 prevents communication between the annular groove 80 and the cavity 73, in which the spring 76 is located. The fluid pressure in the chamber 77 is the same pressure as exists in the chamber 70. This is the reaction pressure which acts on valve member 72 against the force of the operator applied through thrust member 90. The chamber 77 formed in the central cavity by the reduced diameter portion 78 communicates with the chamber 70 at all times through the passage 108. The chamber 77 is appropriately termed a reaction chamber since the pressure existing in this chamber acts on the area of the valve member 72 as defined by the reduced diameter portion 78, opposing the force applied by the operator through member 90.

A valve member 88 is carried by thrust member 90 and is coaxially arranged with respect to the valve member 72 for seating on the spherical portion 92 of the last mentioned valve member 72. In order to accommodate the large braking forces exerted through the thrust member 90, connected to a brake foot pedal (not shown) by linkage 94, during nonpower braking, a thrust sleeve 96 is threadedly secured to member 90. A flange 98 extends radially from body portion 100 of the thrust sleeve 96. The body portion 100 is concentrically positioned with respect to the valve members 72 and 88 and projects axially with respect to valve member 88 for driving engagement with the seating element 74 upon failure of fluid pressure source. A spring 102 is located between the flange 98 and the seating element 74 to urge the thrust member 90 to the right as viewed in FIG. 1. This unseats valve member from the spherical portion 92 of the valve member 72 so that chamber 70 communicates with chamber 52 via passages 82 and 83.

The main central stepped cavity 68 of the piston is threaded at its outer diameter portion 104 to receive a nut 106 which retains the operator-operated means comprising the valve means 64 and push-through means 66 in assembled relationship within the main central cavity of the piston. As viewed in FIG. 1, during normal braking with power, i.e., utilizing fluid pressure, the application of a braking force to the thrust member 90 moves the member 88 against the spherical portion 92 of the valve member 72 to unseat the latter to admit pressurized fluid to chamber 70. However, if fluid pressure should fail, further movement of the thrust member 90 will urge the body portion 100 of the sleeve 96 into engagement with seating element 74 which will now carry the braking effort of the operator to be transmitted into the piston 22 to cause the latter to advance to the left.

To facilitate piston movement toward the left end of the bore, as aforesaid, at times during no-power braking, i.e., fluid pressure failure, the piston is provided with a passage 108 which communicates the chamber 70 with the chamber 52 to allow for the free flow of fluid between these chambers as fluid is displaced from the chamber 52. A check valve 110 permits flow in one direction only from the chamber 52 to the chamber 70 but blocking reverse flow.

MODE OF OPERATION

Assuming an absence of fluid pressure in the cavity 38 and a nonbraking condition of the brake booster of FIG. 1, the piston 22 and operator-operated means will be in the relative positions shown, with the piston at the right end of the bore against the flange 24 and the thrust member 90 urged to the right under the influence of the spring 102, so that valve member 88 is unseated from spherical valve member 92, thus establishing free communication between chambers 70 and 52 via passages 82 and 83. At this time, valve member 72 is seated on element 74, thereby closing cavity 73 to chamber 70. It is observed with reference to FIG. 1, that the movable land 42 is urged by the spring 39 into contact with the snap ring 58 located in the housing bore 20. There is a space S' between the snap ring 54 and the land 42. Of course, the master cylinder return spring (not shown) acts on the piston 22 through the rod 32 to hold the piston in its present position.

If during an absence of fluid pressure in the cavity 38, whether due to a rupture in the line (not shown) connecting the inlet 12 or for any reason, a braking application is desired, the operator pushes the thrust member 90 to the left, as viewed in FIG. 1, first compressing the spring 102 and subsequently engaging the body portion 100 with the seating element 74. This action advances the piston to the left, thus transmitting a driving force to the master cylinder piston (not shown) through the rod 32, in a manner well known to those skilled in the art. The check valve 110 allows fluid to pass from the chamber 52 to the chamber 70 as the piston 22 moves leftward during the push-through maneuver by the operator. Attention is directed to the ineffectiveness of the spring 39 to resist piston movement to the left in the circumstances due to the fact that the land 42 is not in engagement with the snap ring 54 such that the force of the spring 39 acts on the piston. This can be seen in FIG. 1 with reference to the space S'.

Figure 2:
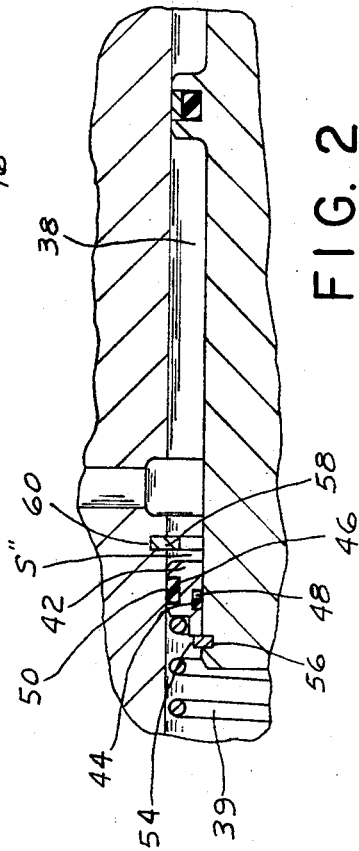
FIG. 2 is an enlarged fragmentary section of FIG. 1 showing details of certain elements of the piston return mechanism.

Assuming a situation in which the cavity 38 is exposed to fluid pressure, the parts of the brake booster will be positioned as shown in FIG. 1, except for the movable land 42 which will be located against the snap ring 54, as shown in FIG. 2. There is now the space S'' between the land 42 and the snap ring 58. With fluid pressure in the cavity 38 the land 42 is forced against the snap ring 54 at all times and the spring 39 acts on the piston through the land 42 to urge the piston toward the right end of the bore, as viewed in FIG. 1. To make a brake application with fluid pressure available in cavity 38, the thrust member 90 is moved to the left, as viewed in FIG. 1, causing the valve member 88 to first engage spherical member 92 to close off communication between chambers 52 and 70. Continued movement of member 90 unseats spherical member 92 from seating element 74 to connect chamber 70 with inlet pressure via cavity 73. The fluid pressure acting in the chamber 70 moves the piston 22 and rod 32 to the left which actuates the master cylinder piston to which the rod 32 is connected, in a manner well known to those skilled in the art. The continuous application of force to the thrust member 90 will cause the piston to continue its movement to the left to actuate the master cylinder as aforementioned. The force applied by the operator to the thrust member 90 is resisted by the reaction pressure acting in the chamber 77 and on the end of the valve member 72. It is to be noted that piston movement to the left by fluid pressure acting in the chamber 70 is always against the force of return spring 39 since the pressure in cavity 38 holds the land 42 in engagement with the ring 54. However, as aforementioned, this is not the case when the piston is moved manually by push-through action of the operator. In the latter case the land 42 is in contact with the snap ring 58 and spaced from the snap ring 54, as best seen in FIG. 2. At this time spring 39 offers no opposition to piston movement.

I claim:

1. A hydraulic boost device comprising:
a housing having a bore therein;
an inlet in the housing in communication with said bore and connectible to a fluid pressure source;
a piston slidably positioned in said bore and at time subjected to said fluid pressure source;
operator-operated means for controlling movement of said piston toward one end of said bore under the influence of fluid pressure, said means also including mechanism for controlling movement of said piston toward one end of said bore solely through manual effort; and
piston return means urging said piston toward the other end of said bore at times when the inlet is subjected to a fluid pressure source, said piston return means becoming ineffective in urging said piston in the direction aforementioned upon failure of inlet fluid pressure to thereby enable the operator to manually move the piston more rapidly toward said one end of the bore;
said piston return means including resilient means, and connecting means responsive to the fluid pressure level at said inlet for operably connecting said resilient means to said piston when the fluid pressure at said inlet exceeds a predetermined level, said connecting means disconnecting said resilient means from said piston upon failure of the inlet fluid pressure level.

2. A hydraulic boost device as in claim 1, characterized in that said operator-operated means includes valve means for communicating said inlet to the other end of said bore and push-through means for effectuating piston movement.

3. A hydraulic boost device as in claim 2, wherein said operator-operated means is located in said piston.

4. A hydraulic boost device as in claim 2, characterized in that said valve means and push-through means are coaxial with the piston.

5. A hydraulic boost device as in claim 1, wherein said piston is provided with a passage in communication with its respective ends, and a check valve in said passage to thereby facilitate piston movement toward said one end of the bore at times when said piston is moved manually solely by the operator.

6. A hydraulic boost device as in claim 1, wherein said piston is provided with a passage which communicates with the ends of said piston, and a check valve in said passage.

7. A hydraulic boost device comprising:
a housing having a bore therein;
an inlet in the housing in communication with said bore and connectible to a fluid pressure source;
a piston slidably positioned in said bore and at times subjected to said fluid pressure source;
operator-operated means for controlling movement of said piston toward one end of said bore under the influence of fluid pressure, said means also including mechanism for controlling movement of said piston toward one end of said bore solely through manual effort; and
piston return means urging said piston toward the other end of said bore at times when the inlet is subjected to a fluid pressure source, said piston return means becoming ineffective in urging said piston in the direction of aforementioned upon failure of inlet fluid pressure to thereby enable the operator to manually move the piston more rapidly toward said one end of the bore;
said piston return means comprising a movable land carried by said piston, said land being subject to fluid pressure at times, a return spring acting on said movable land in a direction opposing movement of the land by fluid pressure, a stop on said piston against which the fluid pressure urges said land, and a stop located within said bore against which said land is urged by the return spring.

8. A hydraulic brake boost mechanism comprising:
a housing with a bore therein;
inlet and outlet ports in communication with said bore;
a piston slidably positioned in said bore and dividing said bore into two chambers, located at the respective ends of said piston;

operator-operated means including valve means for controlling communication of fluid pressure between said ports and the two chambers to cause piston movement, and further including push-through mechanism which effectuates move-ment of said piston manually upon failure of fluid pressure in one of said chambers; and means acting to resist movement of said piston under fluid pressure but ineffective to resist such movement upon failure of fluid pressure;

said last-named means comprising a movable land mounted on the piston for movement relative thereto and forming therewith a cavity in communication with said inlet port, and resilient means acting on said movable land.

9. A hydraulic brake boost mechanism as in claim 8, wherein check valve means is utilized to control communication between said two chambers to facilitate piston movement during actuation of the push-through mechanism.

10. A hydraulic brake boost mechanism comprising:
a housing with a bore therein;
inlet and outlet ports in communication with said bore;
a piston slidably positioned in said bore and dividing said bore into two chambers, located at the respective ends of said piston;
operator-operated means including valve means for controlling communication of fluid pressure between said ports and the two chambers to cause piston movement, and further including push-through mechanism which effectuates movement of said piston manually upon failure of fluid pressure in one of said chambers; and means acting to resist movement of said piston under fluid pressure but ineffective to resist such movement upon failure of fluid pressure;

said last-mentioned means including resilient means and connecting means responsive to the fluid pressure level at said inlet port for operably connecting said resilient means to said piston when the fluid pressure level at said inlet port exceeds a predetermined level, said connecting means disconnecting said resilient means from said piston upon failure of the fluid pressure level at said inlet port.

* * * * *